(12) United States Patent
Sakata

(10) Patent No.: US 11,915,727 B2
(45) Date of Patent: Feb. 27, 2024

(54) VIDEO PLAYBACK SYSTEM, VIDEO PLAYBACK METHOD, AND VIDEO PLAYBACK PROGRAM

(71) Applicant: Takeki Sakata, Tokyo (JP)

(72) Inventor: Takeki Sakata, Tokyo (JP)

( * ) Notice: Subject to any disclaimer, the term of this patent is extended or adjusted under 35 U.S.C. 154(b) by 139 days.

(21) Appl. No.: 17/598,133

(22) PCT Filed: Mar. 23, 2020

(86) PCT No.: PCT/JP2020/012738
§ 371 (c)(1),
(2) Date: Sep. 24, 2021

(87) PCT Pub. No.: WO2020/196414
PCT Pub. Date: Oct. 1, 2020

(65) Prior Publication Data
US 2022/0172747 A1    Jun. 2, 2022

(30) Foreign Application Priority Data

Mar. 25, 2019 (JP) ................. 2019-056964

(51) Int. Cl.
*G11B 27/34* (2006.01)
*G11B 27/10* (2006.01)

(52) U.S. Cl.
CPC ............ *G11B 27/34* (2013.01); *G11B 27/102* (2013.01)

(58) Field of Classification Search
CPC .............................. G11B 27/34; G11B 27/102
See application file for complete search history.

(56) References Cited

U.S. PATENT DOCUMENTS

| | | | | |
|---|---|---|---|---|
| 2016/0283095 | A1* | 9/2016 | Onoda | G06F 3/0482 |
| 2016/0375341 | A1* | 12/2016 | Onoda | G06V 20/46 |
| | | | | 386/240 |
| 2019/0001189 | A1* | 1/2019 | Weems | A63B 24/0062 |
| 2020/0133976 | A1* | 4/2020 | Avnor | H04N 21/8547 |
| 2020/0286523 | A1* | 9/2020 | Wiklof | G11B 27/102 |

FOREIGN PATENT DOCUMENTS

| | | |
|---|---|---|
| JP | 2006311430 A | 11/2006 |
| JP | 201711668 A | 1/2017 |
| JP | 2018207302 A | 12/2018 |

OTHER PUBLICATIONS

International Search Report of PCT/JP2020/012738 dated May 26, 2020 (2 pages).

* cited by examiner

*Primary Examiner* — Sunghyoun Park
(74) *Attorney, Agent, or Firm* — Calfee, Halter & Griswold LLP

(57) ABSTRACT

A problem to be solved is to realize a moving image playback system capable of sequentially referring to a desired scene in sports on the basis of at least a score in a game.
Realized is a moving image playback system provided with an input means that performs input processing of a time stamp corresponding to play result information including at least a score, a display means that performs display processing of each of a plurality of display objects indicating the play result information and corresponding to the time stamp, and a management means that associates a moving image with the plurality of display objects, in which the display means performs playback processing of the moving image based on the time stamp in response to designation of the display object as a turning point.

12 Claims, 14 Drawing Sheets

(a)

(b)

(c)

VIDEO PLAYBACK SYSTEM, VIDEO PLAYBACK METHOD, AND VIDEO PLAYBACK PROGRAM

CROSS-REFERENCE TO RELATED APPLICATIONS

This application is a 371 of PCT Application No. PCT/JP2020/012738, filed on Mar. 23, 2020, which claims priority to Japanese Application No. 2019-056964, filed on Mar. 25, 2019, the contents of which are hereby incorporated by reference as if recited in their entirety.

TECHNICAL FIELD

The present invention relates to a moving image playback system, a moving image playback method, and a moving image playback program.

BACKGROUND ART

Conventionally, there has been provided a technology for realizing management of play information provided with an added value by associating a score in sports with a game moving image.

Patent Literature 1 discloses the invention relating to a score book provided with a detection unit that detects first information indicating a start point of a scene included in video data, a temporary tag generation unit that generates a temporary tag including time information of the first information in a case where the detection unit detects the first information, a tag ID impartment unit that issues a tag ID for associating the temporary tag with second information and imparts the tag ID to the second information when the second information is externally input, and a score book processing unit that creates a score book from the second information, in which the temporary tag generation unit makes a set of the temporary tag immediately before the tag ID is issued and the tag ID (Patent Literature 1).

CITATION LIST

Patent Literature

Patent Literature 1: JP 2017-11668 A

SUMMARY OF INVENTION

Technical Problem

However, information indicating a game situation, a play content and the like of sports have an enormous amount of information, and it is not easy to sequentially refer to a moving image of a desired scene.

The present invention has been achieved in view of the above circumstances, and a problem to be solved is to realize a moving image playback system capable of sequentially referring to a desired scene in sports on the basis of at least a score in a game.

Solution to Problem

In order to solve the above-described problem, the present invention is a moving image playback system provided with an input means that performs input processing of a time stamp corresponding to play result information including at least a score, a display means that performs display processing of each of a plurality of effective display objects indicating the play result information and corresponding to the time stamp, and a management means that associates a moving image with the plurality of effective display objects, in which the display means performs playback processing of the moving image based on the time stamp in response to designation of the effective display object as a turning point.

With such a configuration, playback of a game moving image in sports may be interactively realized. Specifically, playback processing of a scene desired by a user may be rapidly performed. With such a configuration, a work time of the user until designating the scene for performing display processing of a desired moving image may be reduced, so that there is a technical effect of reducing power consumption of a computer device that realizes a function of the moving image playback system and a database load.

In a preferred aspect of the present invention, a distance between the effective display object and a nearest neighbor effective display object regarding the effective display object is a first predetermined distance.

In a preferred aspect of the present invention, a distance between the effective display object and a second nearest neighbor effective display object regarding the effective display object is a second predetermined distance or a third predetermined distance.

In a preferred aspect of the present invention, a distance between the effective display object and a third nearest neighbor effective display object regarding the effective display object is a fourth predetermined distance or a fifth predetermined distance.

With such a configuration, one or more effective display objects corresponding to the play result information are regularly arranged. Therefore, a design rule of a screen including one or more effective display objects is standardized. With such a configuration, there is a technical effect of optimizing rendering based on a display range, and reducing power consumption at an application level.

In a preferred aspect of the present invention, the display means performs display processing of one or more of the effective display objects on the basis of a time axis and a score axis.

With such a configuration, in sports in which there are various score combinations, it is possible to perform display processing of a change with time in game progress in a mode of a line graph or a data plot and provide an intuitive user interface for moving image playback. With such a configuration, a work time of the user until designating the scene for performing display processing of a desired moving image may be reduced, so that there is a technical effect of reducing power consumption at an application level and a database load.

In a preferred aspect of the present invention, the management means associates each of the plurality of effective display objects with additional information, and the display means distinguishes at least one of the plurality of effective display objects in appearance on the basis of the additional information and performs display processing.

In a preferred aspect of the present invention, the management means determines the additional information on the basis of voice information.

In a preferred aspect of the present invention, the additional information is determined on the basis of play type information subjected to input processing by the input means.

In a preferred aspect of the present invention, the display means performs display processing of a thumbnail image corresponding to each of at least one time stamp corresponding to the effective display object, and performs playback processing of the moving image based on the time stamp corresponding to a designated thumbnail image in response to designation of any one of the thumbnail image by the input means as a turning point.

The present invention is a moving image playback method that allows a processor of a computer to execute an input step of performing input processing of a time stamp corresponding to play result information including at least a score, a display step of performing display processing of each of a plurality of display objects indicating the play result information and corresponding to the time stamp, and a management step of associating a moving image with the plurality of effective display objects, in which the display step performs playback processing of the moving image based on the time stamp in response to designation of the effective display object as a turning point.

The present invention is a moving image playback program that allows a computer to serve as an input means that performs input processing of a time stamp corresponding to play result information including at least a score, a display means that performs display processing of each of a plurality of effective display objects indicating the play result information and corresponding to the time stamp, and a management means that associates a moving image with the plurality of effective display objects, in which the display means performs playback processing of the moving image based on the time stamp in response to designation of the effective display object as a turning point.

Advantageous Effects of Invention

According to the present invention, it is possible to realize a moving image playback system capable of sequentially referring to a desired scene in sports on the basis of at least a score in a game.

DESCRIPTION OF EMBODIMENTS

First Embodiment

Hereinafter, a moving image playback system 1 according to the present invention is described with reference to the drawings. Note that a first embodiment hereinafter described is an example of the present invention; the present invention is not limited to the following first embodiment and various configurations may also be adopted.

For example, in the first embodiment, a configuration, an operation and the like of the moving image playback system 1 are described, but a method, a computer device, a computer program, a recording medium and the like having similar configurations may also exhibit similar functional effects. The program may also be stored in the recording medium.

By using this recording medium, the program may be installed in the computer device, for example. Herein, the recording medium in which the program is stored may be a non-transitory recording medium such as a CD-ROM, for example.

In the first embodiment, a case of performing display processing of play type information of tennis, a moving image of tennis, and a display object indicating play result information of tennis among sports is illustrated.

The sports to which the first embodiment is applied are not limited to tennis, and as long as a part of the sports such as a score may be digitized, the type thereof is not limited.

The play result information in this embodiment includes at least a score indicating scoring points in sports. The play result information further includes numerical value information such as a flying distance of a hit ball. The play result information further includes character string information such as a technique name such as a triple axel.

Furthermore, in the first embodiment, notification regarding the moving image playback system is performed using an application stored in a user terminal 2. The notification regarding the moving image playback system is not limited to this, and various methods such as a method of transmitting an e-mail to a user's e-mail address and an SMS may be used, for example.

Figure 1:
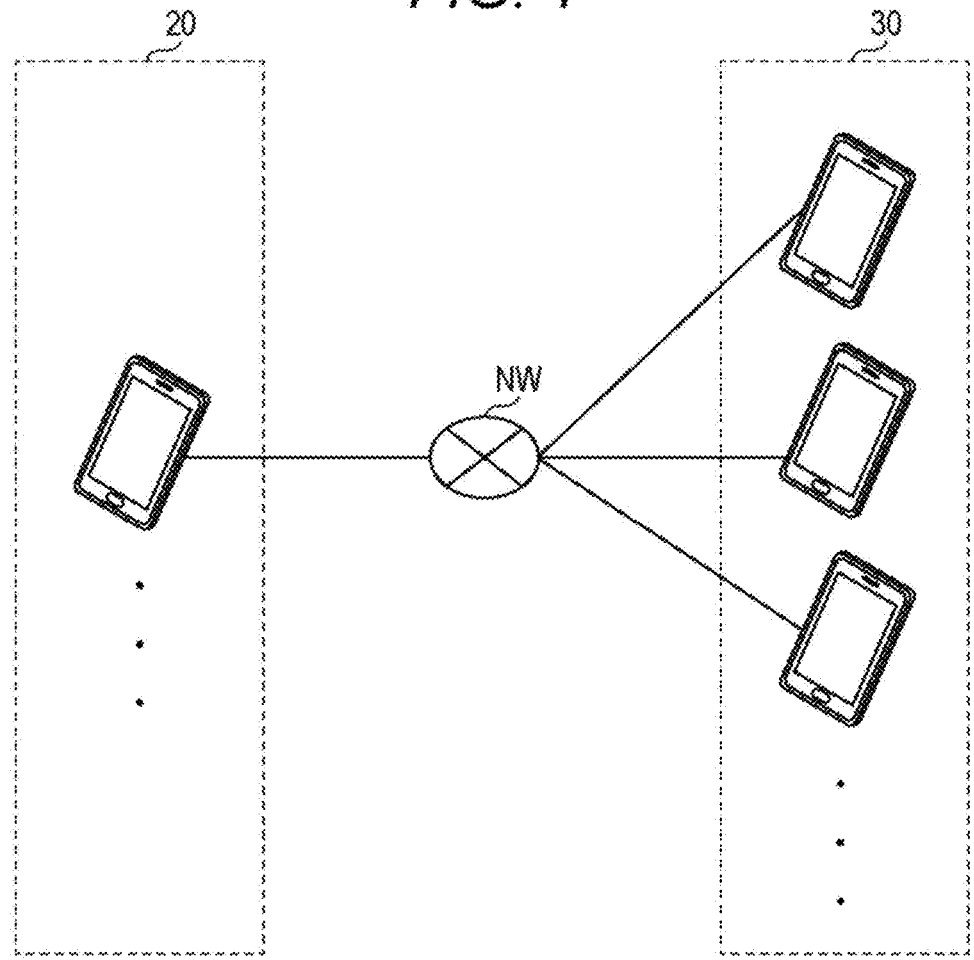
FIG. 1 is a functional block diagram of a first embodiment.
Figure 1:
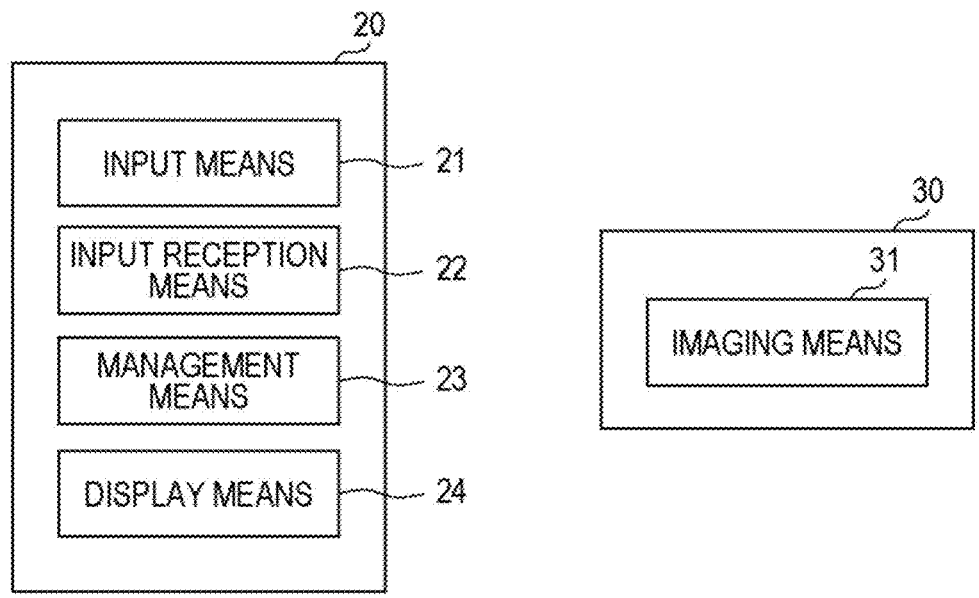

FIG. 1(a) is a schematic diagram of the moving image playback system 1 according to the first embodiment. The moving image playback system 1 at least includes the user terminal 2. The user terminal 2 includes an input/output user terminal 20 and an imaging user terminal 30, and mutual communication between them may be performed via a network NW.

FIG. 1(b) is a functional block diagram of the moving image playback system 1 according to the first embodiment. The input/output user terminal 20 is provided with an input means 21 (corresponding to an input step), an input reception means 22 (corresponding to an input reception step), a management means 23 (corresponding to a management step), and a display means 24 (corresponding to a display step).

The input means 21 is used for inputting the play type information. The input means 21 performs display processing of an object indicating an input unit for at least one of input processing, input cancellation processing, and input confirmation processing of the play type information, and history information of an input content. The input means 21 may be used for input processing of specifying the play type information as a criterion as a query. Note that the input means 21 may include a game situation that may be expressed by at least one of a set count, a game count, and a point count in the query.

The play type information includes information regarding in or out of a hit ball and the like as information regarding a play content. The play type information includes not only a fault, an ace, and a winner by a server and a returner but also information regarding make forced error and an unforced error. The play type information includes information regarding a type of a stroke including a smash in addition to a type of a spin including a slice.

The play type information may also include stats. The stats include at least one of occurrence frequencies of faults and double faults, success rates on first serves and second serves, and information regarding keep and break.

In the embodiment according to the present invention, the input processing by the input means 21 may be performed via various routes such as an external service via an application programming interface (API).

The play type information includes recommendation intention information. The input processing of the recommendation intention information is performed by a user for the purpose of evaluating a play in sports. Specifically, the user performs the input processing of the recommendation intention information in a mode of binary data for the purpose of making a favorable evaluation for the play or an evaluation that the play should be particularly stated. As an example, the recommendation intention information is information that may be set with designation of a social button, a favorite button, a like button, a nice button and the like.

The input reception means 22 receives the input processing of the play type information and a time stamp performed via the input means 21. The input reception means 22 is used for input reception processing of the play type information by a user operation, reception processing of an intention input regarding input cancellation, reception processing of an intention input regarding input confirmation, and input reception processing of a moving image.

The time stamp in the first embodiment preferably takes a mode of an elapsed time from a game start time point as a start point. The game start time point may be set to a time point when the input processing is performed by the input means 21, or may be appropriately set by the user operation after the time stamp is stored. The time stamp may be time information based on Greenwich Mean Time and the like.

The play type information and the moving image are stored in a database DB. In the first embodiment, the moving image may be externally imported via the network NW and the like.

The input reception means 22 may receive, by the input means 21, input processing of environmental information that affects the game situation. The environmental information includes at least one of temperature information, humidity information, weather information, venue information indicating a condition of a game venue such as a court and a field, and position information of a court, a player, and/or a ball.

The management means 23 associates the display object corresponding to the play result information with at least the time stamp on the basis of the user operation. The management means 23 updates the display object as an effective display object in the database DB. At that time, the play type information is preferably subdivided as appropriate by the management means 23 on the basis of a timing at which set, game, point acquisition statuses (corresponding to the set count, game count, and point count, respectively) change. At that time, the subdivided play type information is associated with the play result information and the display object by the management means 23. The time stamp is stored each time the intention input regarding the input confirmation processing is received by the input reception means 22.

It may be grasped that the management means 23 associates the display object with at least one time stamp. The "at least one time stamp" herein refers to, as an example, at least one time stamp independent from the number of sets (set count) and the number of games (game count) but corresponding to the play result information of the same number of points (point count). At that time, the "at least one time stamp" may refer to at least one time stamp independent from the number of points (point count) but corresponding the play result information of the same number of sets (set count) and/or the same number of games (game count). Herein, the game situation of the "at least one time stamp" is the same.

The management means 23 may associate a thumbnail image, which is a frame image at a specific time point of the moving image indicated by the time stamp or a predetermined frame image in a specific section of the moving image indicated by consecutive time stamps, with the display object and the play result information.

Note that, even in a case where there is no corresponding time stamp in arbitrary set count, game count, and point count, the management means 23 may, in a case where there is the time stamp of the corresponding point count in the set count and game count different from the arbitrary set count and game count, respectively, handle the display object corresponding to the point count as the effective display object and update the database DB.

The management means 23 may select or determine, on the basis of the play type information as the query subjected to the input processing by the input means 21, the play result information, the display object, or the time stamp on the basis of the query. The query is, as an example, a query that a first serve is in (not a fault). The query may be appropriately set on the basis of at least a part of various types of information that may be input as the play type information.

The management means 23 associates additional information with the play result information. As an example, the additional information is used as an index indicating a degree of excitement in sports, and takes a mode of numerical data or binary data. The additional information may be, as an example, the play type information itself or a flag based on the play type information.

The additional information may take a mode of the flag in the play type information. The additional information is determined on the basis of the play type information and/or audio information. Note that the additional information preferably includes one or more flags.

As an example, the additional information is determined on the basis of the number of rallies included in the play type information. At that time, it may be grasped that, as an example, in a case where the number of rallies exceeds a predetermined threshold, the additional information takes a value of predetermined data including any of the binary data. As an example, the additional information is determined on the basis of presence or absence of a service ace or a return ace for each point included in the play type information. At that time, it may be grasped that, as an example, in a case where the service ace is established, the additional information takes a value of predetermined data including any of the binary data.

The additional information is determined on the basis of the recommendation intention information as an example. It may be grasped that, as an example, the additional information takes a value of predetermined data including any of the binary data, in a case where the recommendation intention information indicates the favorable evaluation for the play or the evaluation that the play should be particularly stated (corresponding to a state in which the social button is designated).

As an example, when a volume indicated by the audio information exceeds a threshold, the additional information is corrected upward or a positive value is introduced. The audio information is preferably determined on the basis of the moving image. The audio information may be separately imported into the user terminal 2.

The display means 24 performs display processing of the display object having an appearance indicating a point status (corresponding to the point count) such as 0-0 or 15-0 as an example. The display means 24 performs display processing of the play type information associated with the effective display object in response to designation of the effective display object as a turning point. The display means 24 may perform playback processing of the moving image associated with the effective display object from a specific time point on the basis of the time stamp, and may perform the playback processing of the moving image from the specific time point on the basis of the time stamp associated with the effective display object.

The display means 24 may perform display processing of the thumbnail image corresponding to each of at least one time stamp corresponding to the effective display object, and may perform the playback processing of the moving image from a specific point on the basis of the time stamp corresponding to the thumbnail image designated by the input means 21. At that time, the display means 24 may sort at least one thumbnail image for each set, each game, or each point in display order and list (corresponding to multiple display).

At that time, the display means 24 may sort at least one thumbnail image in display order on the basis of the play type information and list. Herein, the display means 24 may perform the display processing of at least one thumbnail image such that this is superimposed on the display object.

Note that the display means 24 may perform the display processing on the basis of a mode (referred to as an "A mode") in which the display processing of the display object is performed on the basis of whether an arbitrary point count is the effective display object in a manner limited to the set count and game count, or a mode (referred to as a "B mode") in which the display processing of the display object is performed on the basis of whether an arbitrary point count is the effective display object in a manner not limited to (independent from) the set count and game count.

The display means 24 may perform, on the basis of the play type information as the query subjected to the input processing by the input means 21, the display processing of at least one thumbnail image corresponding to the play result information, the display object, or the time stamp selected on the basis of the query.

The display object may have the appearance indicating the number of acquired games such as 1-0 and 7-6 as an example. Note that the effective display object and other display objects are preferably distinguished from each other in appearance. Note that the display means 24 may perform the display processing so that the effective display object in the A mode and the effective display object in the B mode may be distinguished from each other in appearance.

On the basis of the additional information corresponding to the score, the display means 24 distinguishes the effective display object corresponding to the score in appearance and performs the display processing of the same. At that time, the display processing of the effective display object is performed on the basis of at least one of one or more flags included in the additional information. It goes without saying that an input unit for designating at least one of the flags included in the additional information is subjected to display processing on a display screen W2 and the like.

The display means 24 may distinguish the effective display object in appearance on the basis of presence or absence or the number of thumbnail images corresponding to the effective display object and perform the display processing of the same.

The display means 24 may perform, on the basis of the above-described query, the display processing of the effective display object corresponding to the play type information matching the above-described query such that this may be distinguished from other display objects and effective display objects in appearance.

An imaging means 31 captures a moving image using an imaging device 304 and stores the same in the database DB. The moving image is preferably subjected to data compression using a video codec such as Moving Picture Experts Group (MPEG)-2, MPEG-4, H.264, and H.265, but a compression method is not limited.

Figure 2:
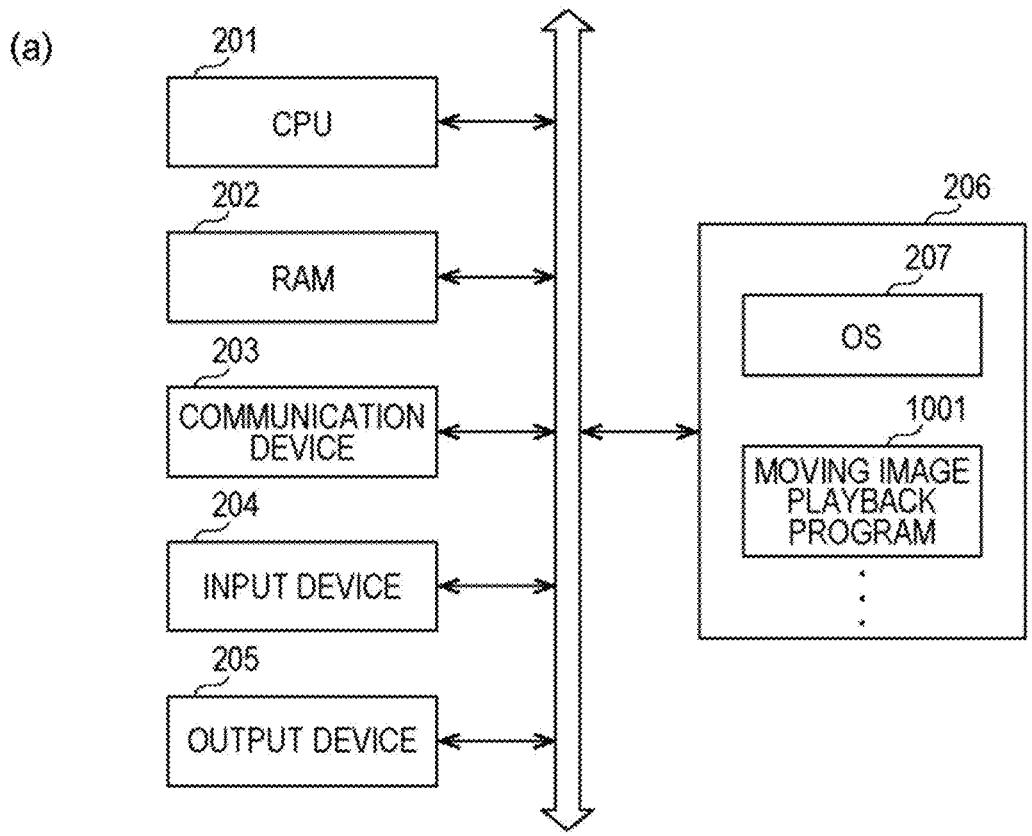
FIG. 2 is a hardware configuration diagram of the first embodiment.
Figure 2:
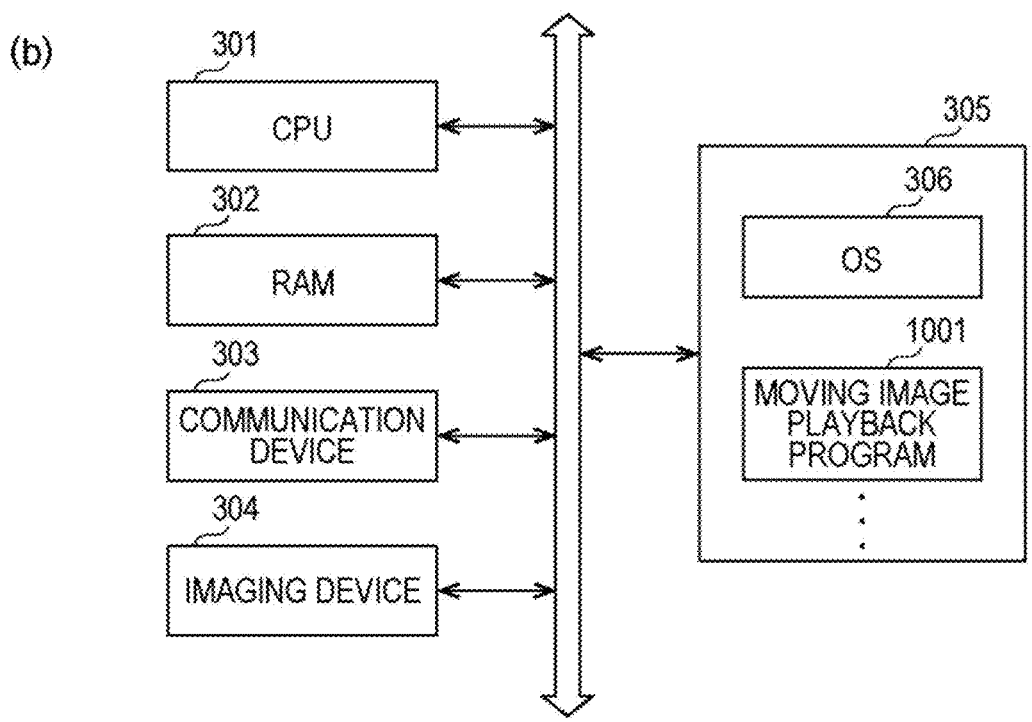

FIG. 2(*a*) illustrates an example of a hardware configuration of the input/output user terminal 20 according to the first embodiment. The input/output user terminal 20 is provided with an arithmetic device 201 including a processor such as a central processing unit (CPU), a main storage device 202 such as a random access memory (RAM), a communication device 203, which is an interface for communicating with an external device via the network NW, an input device 204 formed of a touch panel display and the like, an output device 205, and an auxiliary storage device (recording device 206) formed of a hard disk drive (HDD), a solid state drive (SSD), a flash memory and the like.

In the recording device 206, at least a part of a moving image playback program 1001 that exhibits its function in cooperation with an operating system 207 is recorded. The recording device 206 corresponds to the database DB.

As the input/output user terminal 20, various communication user terminals such as a smartphone, a tablet, and a television may be adopted.

FIG. 2(*b*) is a diagram illustrating an example of a hardware configuration of the imaging user terminal 30 according to the first embodiment. The imaging user terminal 30 is provided with an arithmetic device 301 including a processor such as a central processing unit (CPU), a main storage device 302 such as a random access memory (RAM), a communication device 303, which is an interface for communicating with an external device via the network NW, an imaging device 304 formed of a charge coupled device (CCD) image sensor, a complementary metal oxide semiconductor (CMOS) image sensor and the like, and an auxiliary storage device (recording device 305) formed of a hard disk drive (HDD), a solid state drive (SSD), a flash memory and the like.

In the recording device 305, at least a part of the moving image playback program 1001 that exhibits its function in cooperation with an operating system 306 is recorded. As the imaging user terminal 30, various communication user terminals such as a smartphone and a tablet may be adopted.

The moving image playback system 1 may perform data communication using, for example, Transmission Control Protocol/Internet Protocol (TCP/IP) and the like as a communication protocol via the network NW. The network NW may use various lines such as a community antenna television (CATV) line and a mobile communication network, for example. Furthermore, data transmission/reception using wireless local area network (LAN) communication via an access point or short-range communication such as Bluetooth (registered trademark) and Zigbee (registered trademark) may be performed regardless of a frequency band. There is no limitation on a type of a communication system used for the data transmission/reception. The network NW may also be a wired network.

Figure 3:
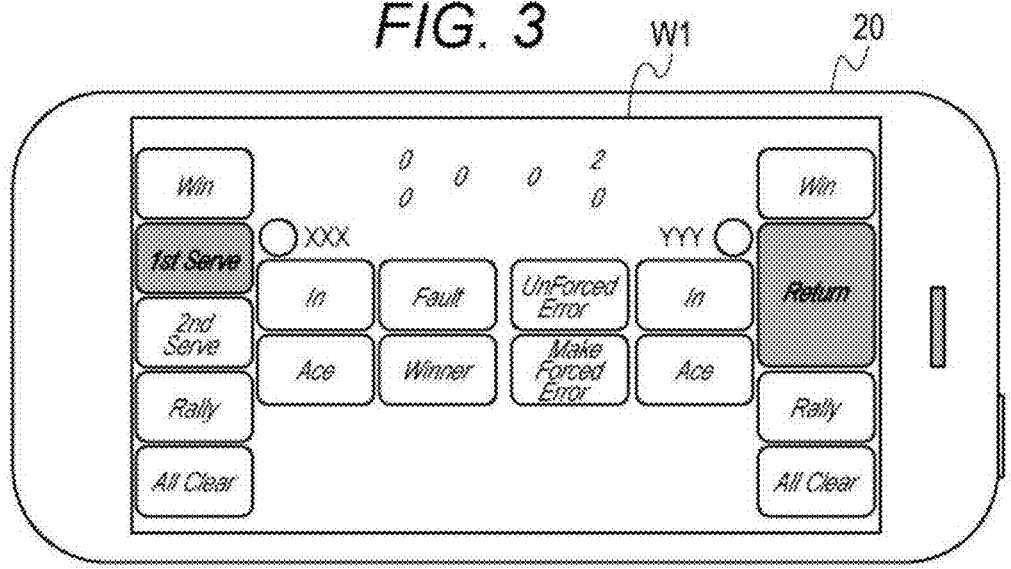
FIG. 3 is a view example of a user terminal with an input screen, a display screen, and a playback screen of the first embodiment.
Figure 3:
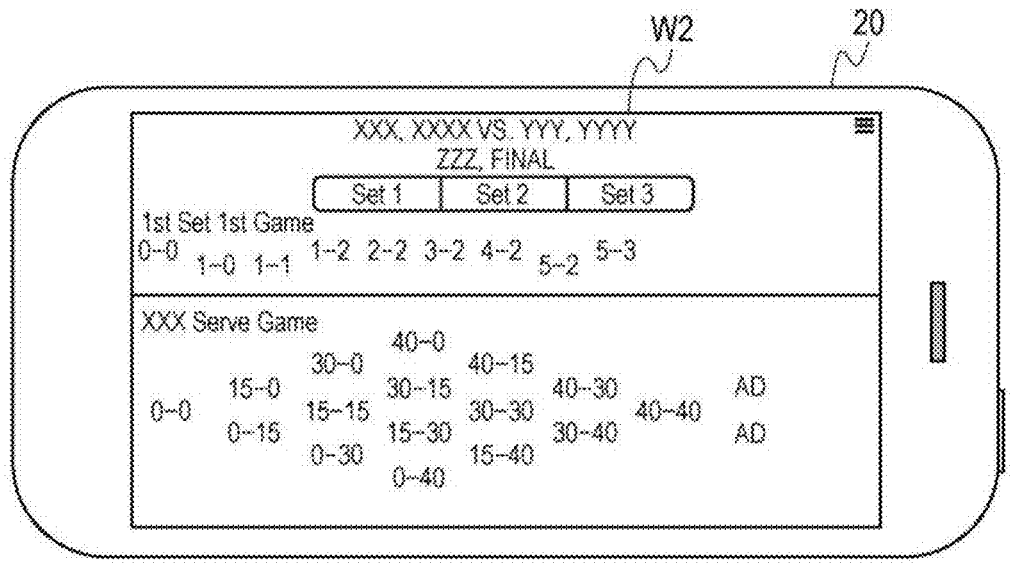
Figure 3:
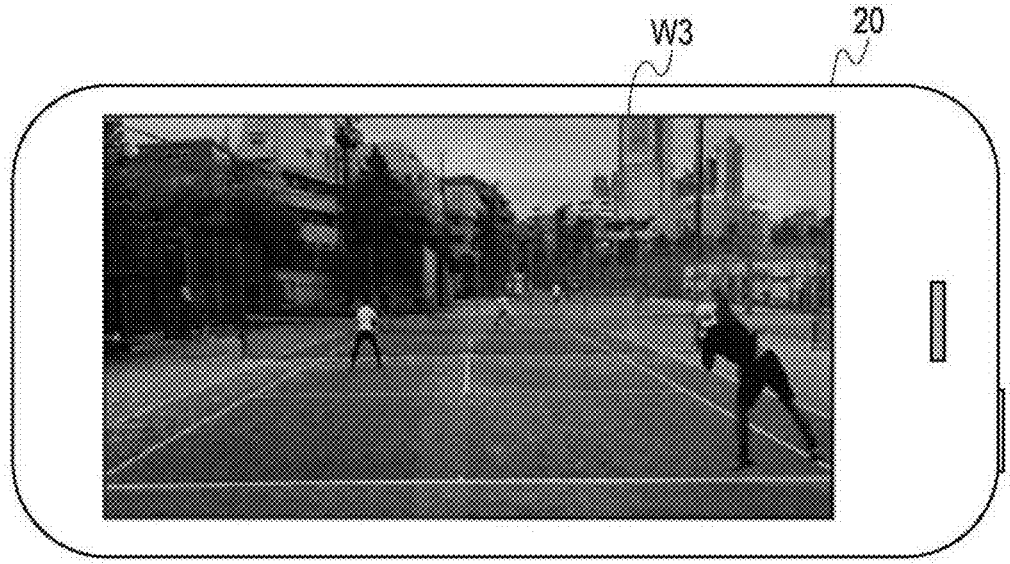

As illustrated in FIGS. 3(a), 3(b), and 3(c), the input/output user terminal 20 according to the first embodiment is used for display processing of an input screen W1, the display screen W2, and a playback screen W3.

In the first embodiment, one user terminal 2 may have all the functions of the input/output user terminal 20 and the imaging user terminal 30. At that time, data may be transmitted/received between a plurality of different user terminals 2 using the communication device 203.

Figure 4:
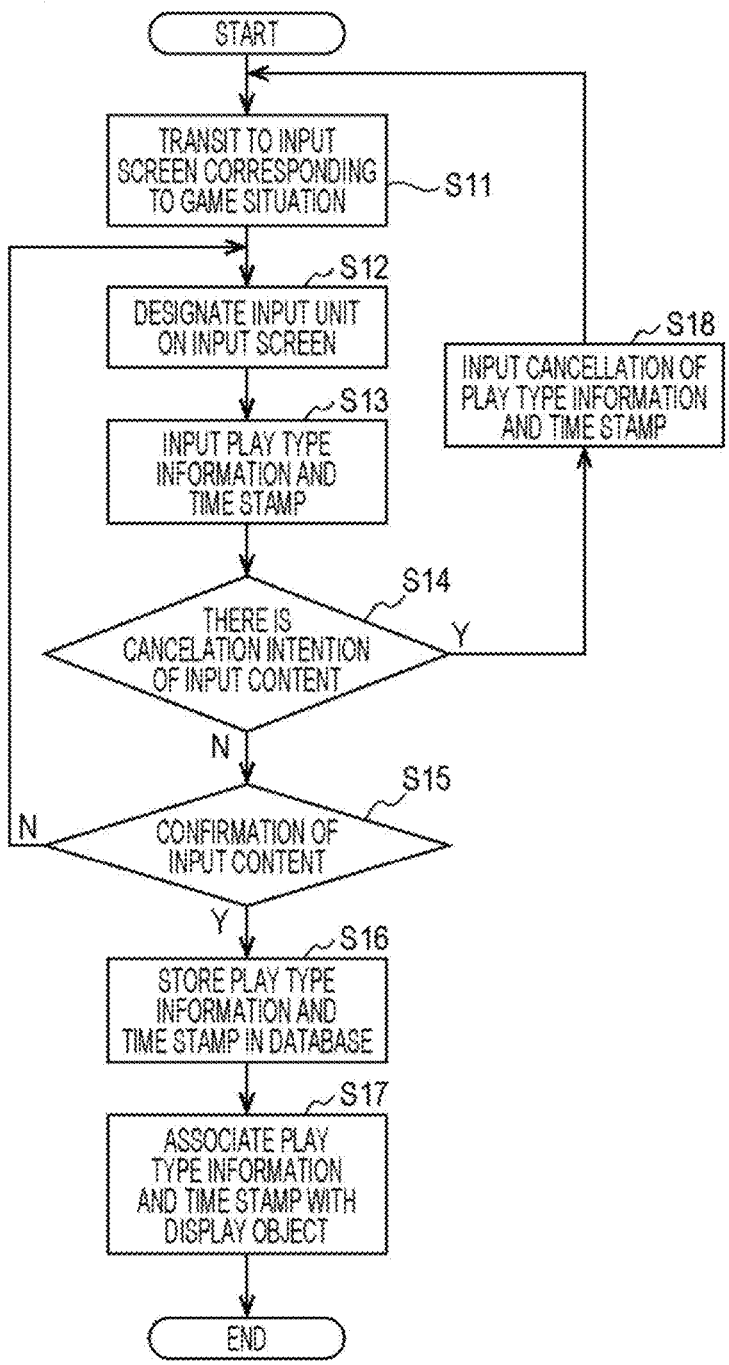
FIG. 4 is a processing flowchart of the first embodiment.
Figure 4:
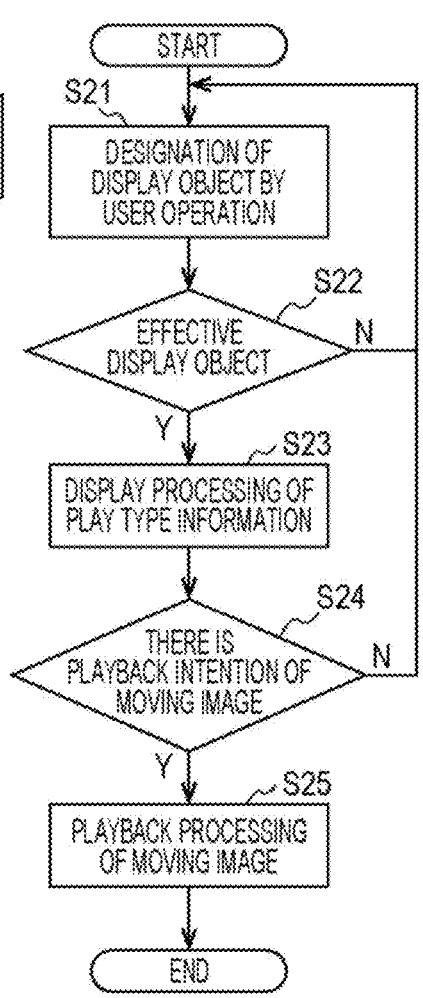

As illustrated in FIG. 4(a), a transition is made to the input screen W1 for performing input processing of the time stamp (step S11). The input screen W1 is also used for the input processing of the time stamp and the like. When the user designates a specific input unit on the input screen W1 (step S12), the input processing of the time stamp is performed (step S13).

The input screen W1 includes a recommendation intention input unit for performing input processing regarding the recommendation intention information. The time stamp and the recommendation intention information are associated with each other by the input processing of the time stamp in a state in which the recommendation intention input unit is designated (step S13).

In a case where there is no cancelation intention of an input content regarding step S13 (No (N) at step S14), by an intention input regarding confirmation of the input content (Yes (Y) at step S15), the input means 21 stores the time stamp subjected to the input processing and the play result information in the database DB in a state in which they are associated with each other (step S16). In a case where no intention input regarding confirmation of the input processing is performed (No (N) at step S15), the procedure transits to a state immediately before step S12. In a case where there is no cancellation intention of the input content regarding step S13 (Yes (Y) at step S14), by an intention input of input cancellation regarding the time stamp, the input means 21 executes input cancellation processing (step S18). Thereafter, the procedure transits to a state immediately before step S11. In the procedure, input processing/storage/association/input cancellation of the play type information together with the time stamp is performed.

After step S16, the management means 23 associates the time stamp stored in the database DB with the display object, and stores the same in the database DB as the effective display object (step S17). The display object may be appropriately determined on the basis of the game situation, or may be appropriately subjected to input processing after step S16. Note that the play type information is associated with the display object together with the time stamp.

As illustrated in FIG. 4(b), on the display screen W2, in response to designation of the display object by the user (step S21) as a turning point, the display means 24 determines whether the designated display object is the effective display object (step S22). In a case where the display object is the effective display object (Yes (Y) at step S22), the display means 24 performs the display processing of the associated play type information (step S23). Note that, in a case where the display object is not the effective display object (No (N) at step S22), the procedure transits to a state immediately before step S21.

In a case where the display processing of the play type information corresponding to the effective display object is performed (step S23), by an intention input regarding the playback processing of the moving image corresponding to the effective display object by the user (Yes (Y) at step S24), the display means 24 performs the playback processing of the moving image (step S25). At that time, the playback processing of the moving image is performed on the basis of the time stamp corresponding to the effective display object (step S25). In a case where no intention input regarding the playback processing of the moving image corresponding to the effective display object is performed (No (N) at step S24), the procedure transits to a state immediately before step S21.

Figure 5:
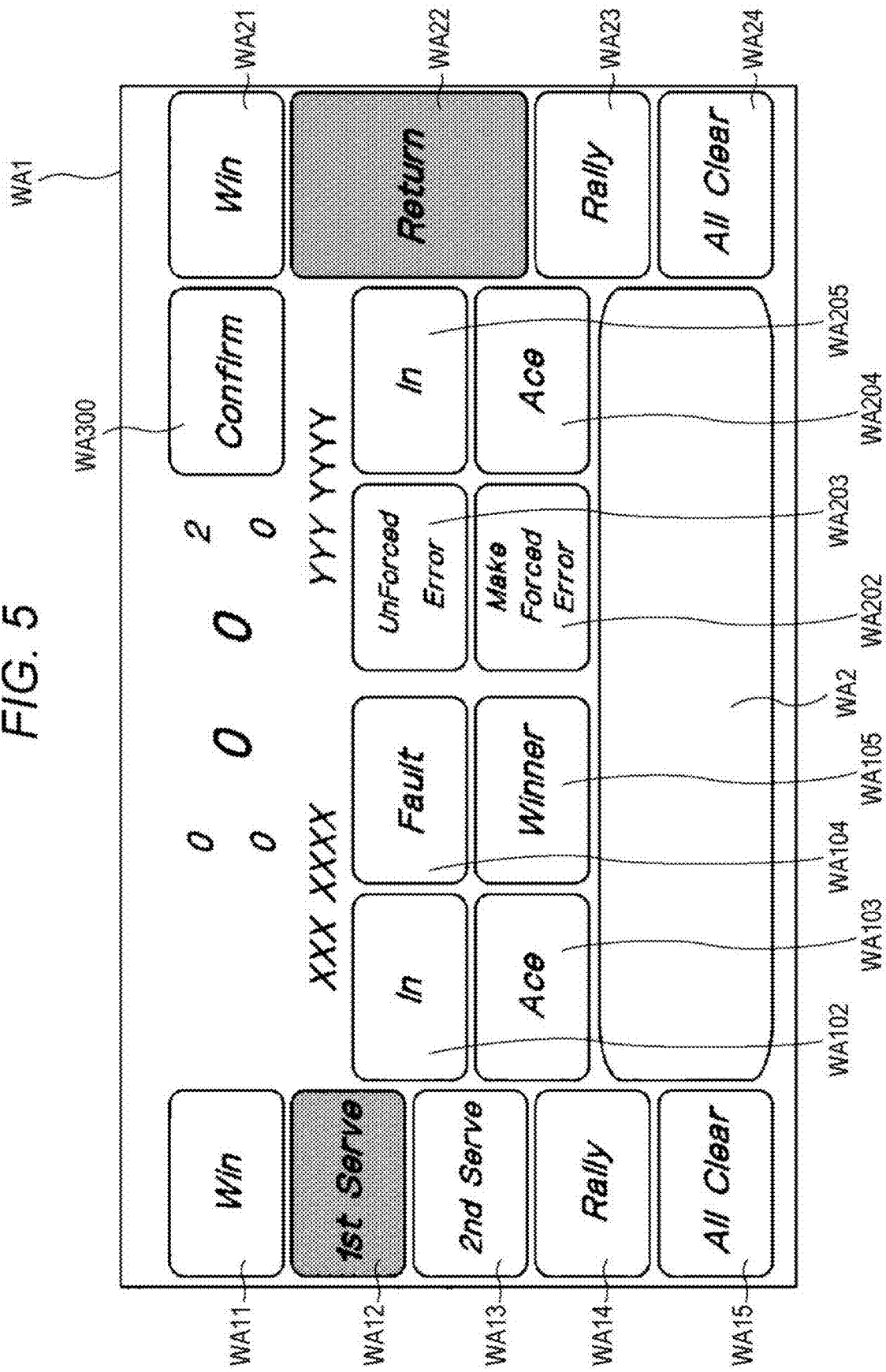
FIG. 5 is a view example of the input screen of the first embodiment.

As illustrated in FIG. 5, an input screen WA1 performs display processing of information regarding set, game, and point acquisition statuses. The input screen WA1 includes input units WA11, WA12, WA13, WA14, WA21, WA22, and WA23 indicating a game situation such as a serve and a rally, and a play content display unit WA2 that performs the display processing of the play type information subjected to input processing on the input screen WA1. The input screen WA1 includes input units WA102, WA103, WA104, WA105, WA202, WA203, WA204, and WA205 for performing the input processing of the play type information. The input screen WA1 includes WA15 and WA24 for performing an intention input regarding input cancellation, and an input unit WA300 for performing an intention input regarding input confirmation. The input screen WA1 may perform display processing of a name, a face photo or the like of a player.

On the input unit on the input screen W1, the input processing of the time stamp and the like may be performed not only by pressing but also contact on a touch panel, a click operation by a tool such as a pointing device and the like. There is no limitation in a method of designating the input unit.

The input units WA12, WA13, and WA14 indicate a first serve, a second serve, and a rally, respectively, and indicate a situation on a server side. Input units WB22 and WB23 indicate a return and a rally, respectively, and indicate a situation on a returner side.

The input processing of the play type information on the input screen WA1 is illustrated below. First, when the input unit WA102 is pressed, input processing of a fact that the serve on the server side is in as the play type information is performed. Next, when the input unit WA204 is pressed, the input processing of the play type information on the returner side indicating a return ace is performed.

When the input unit WA300 is designated in a state in which the input unit WA11 or WA21 is designated, the input processing of the play type information is confirmed to be stored in the database DB. At that time, the input processing of the time stamp together with the play type information is performed, and the input processing is confirmed by designation of the input unit WA300. In a case where the input processing of the time stamp is confirmed, it shifts to the input processing of the time stamp corresponding to the play result information indicating a different score. This corresponds to score transition associated with the point acquisition. At that time, the display processing of the input screen WA1 is initialized.

The input processing of the play type information indicating an error including a fault, make forced error, and an unforced error is performed when the input unit WA104, WA202, or WA203 is pressed.

Note that, in a case where the input processing of the play type information on the server side is not performed, the input processing of only the play type information on the returner side is performed, and the point acquisition status changes, by designating the input unit WA300 in a state in which the input unit WA11 or WA21 is designated, it is possible to transit to input processing of different play result information without performing the input processing of the play type information.

The play type information on the server side or the returner side not yet input may also be determined by the management means 23. For example, in the first serve, in a case where the input processing of only the play type information regarding the return ace is performed by the pressing of the input unit WA204 and the input unit WA102 is not pressed, the play type information indicating that the first serve by the server is in is added/stored as appropriate.

When receiving the input processing of the play type information via the input unit WA102, WA103, WA104, WA105, WA202, WA203, WA204, or WA205, the input screen WA1 is put into a state in which the input units WA12, WA13, WA14 and the like indicating the game situation are designated on the basis of the input processing. For example, in a case where the first serve by the server is not succeeded and the game situation transits to the second serve, the input units WA13 and WB22 are colored and the like to be distinguished from the input units WA12, WA14, and WA23 in appearance.

On the input screen WA1, in order to perform the input processing of the play type information of each of two players or two groups of players, it is preferable that the input units are roughly divided for each player and arranged on right and left sides. This makes it possible to intuitively input the play content and to reduce an erroneous input frequency.

Figure 6:
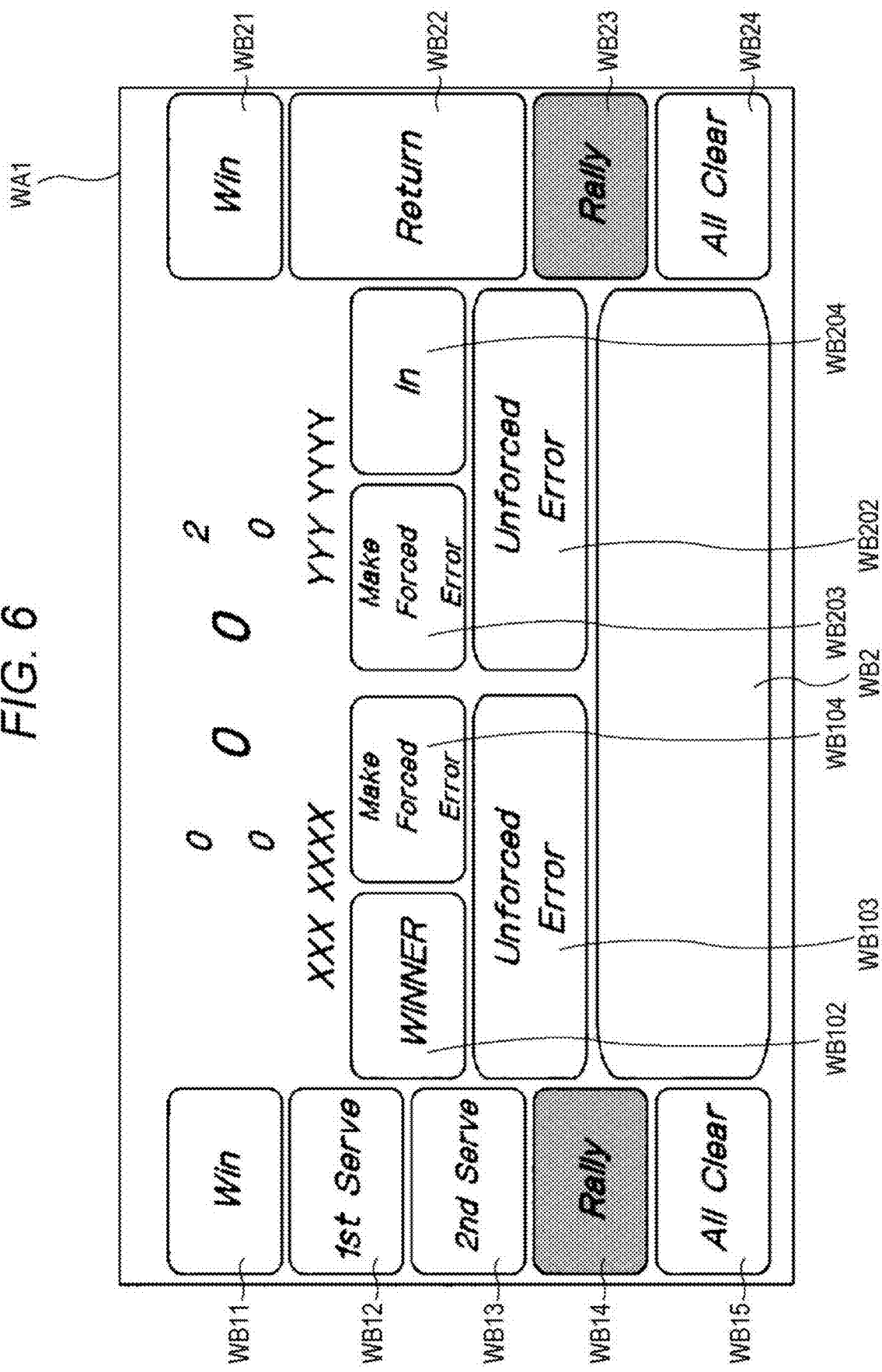
FIG. 6 is a view example of the input screen of the first embodiment.

FIG. 6 illustrates an input screen WB1, which is an example of the input screen according to the first embodiment.

The input screen WB1 is switched from WA1 in a case where the game situation transits to the rally on the input screen WA1.

Figure 7:
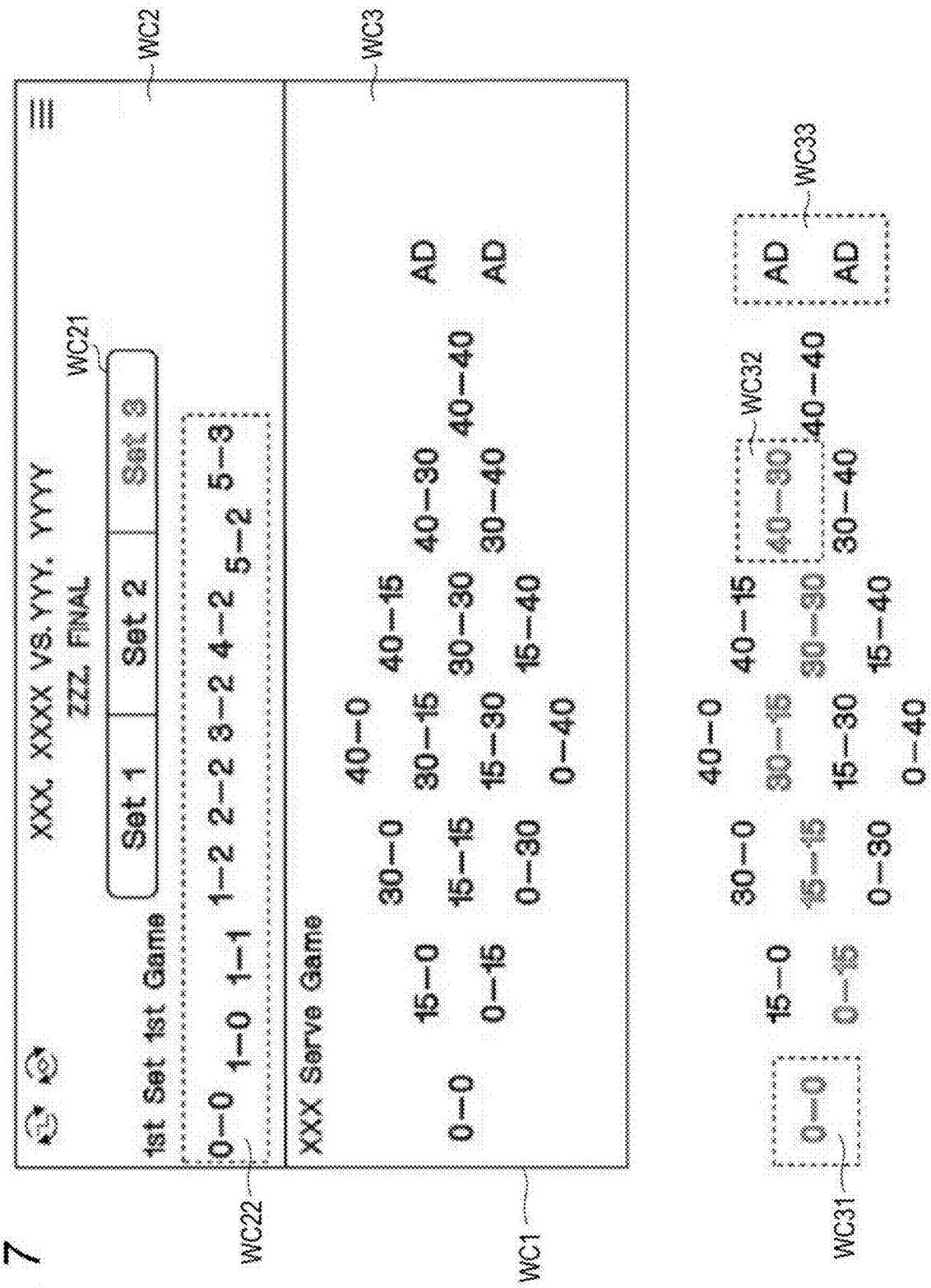
FIG. 7 is a view example of the display screen of the first embodiment.

As illustrated in FIG. 7(a), a display screen WC1 includes a display screen WC2 and a display screen WC3. The display screen WC2 includes score display units WC21 and WC22 that perform display processing of the number of acquired sets and games in addition to names of the player and game venue. In the display screen WC3, one or more display objects are regularly arranged in a mode of a tree structure.

As illustrated in FIG. 7(b). A score display unit WC31 performs the display processing of the effective display object indicating the appearance of 0-0. At that time, the display means 24 regularly arranges a display object group with the effective display object as a start point. A score display unit WC32 performs the display processing of the effective display object corresponding to a point serving as a turning point at which the number of acquired games changes as an end point of the tree structure.

A display object adjacent to an arbitrary display object in a horizontal direction in the display object group regularly arranged in the tree structure preferably indicates a possible score in a case of the same display object in time series as the display object or immediately before or after the same. Specifically, the display object adjacent to the display object having the appearance of 0-0 is the display object having the appearance of 15-0 or 0-15. The display object adjacent to 15-15 in the horizontal direction is the display object having the appearance of 15-0, 0-15, 30-15, or 15-30.

Furthermore, the display object adjacent to the display object having the appearance of 40-40 is the display object having the appearance of 40-30, 30-40, or advantage (AD).

Figure 8:
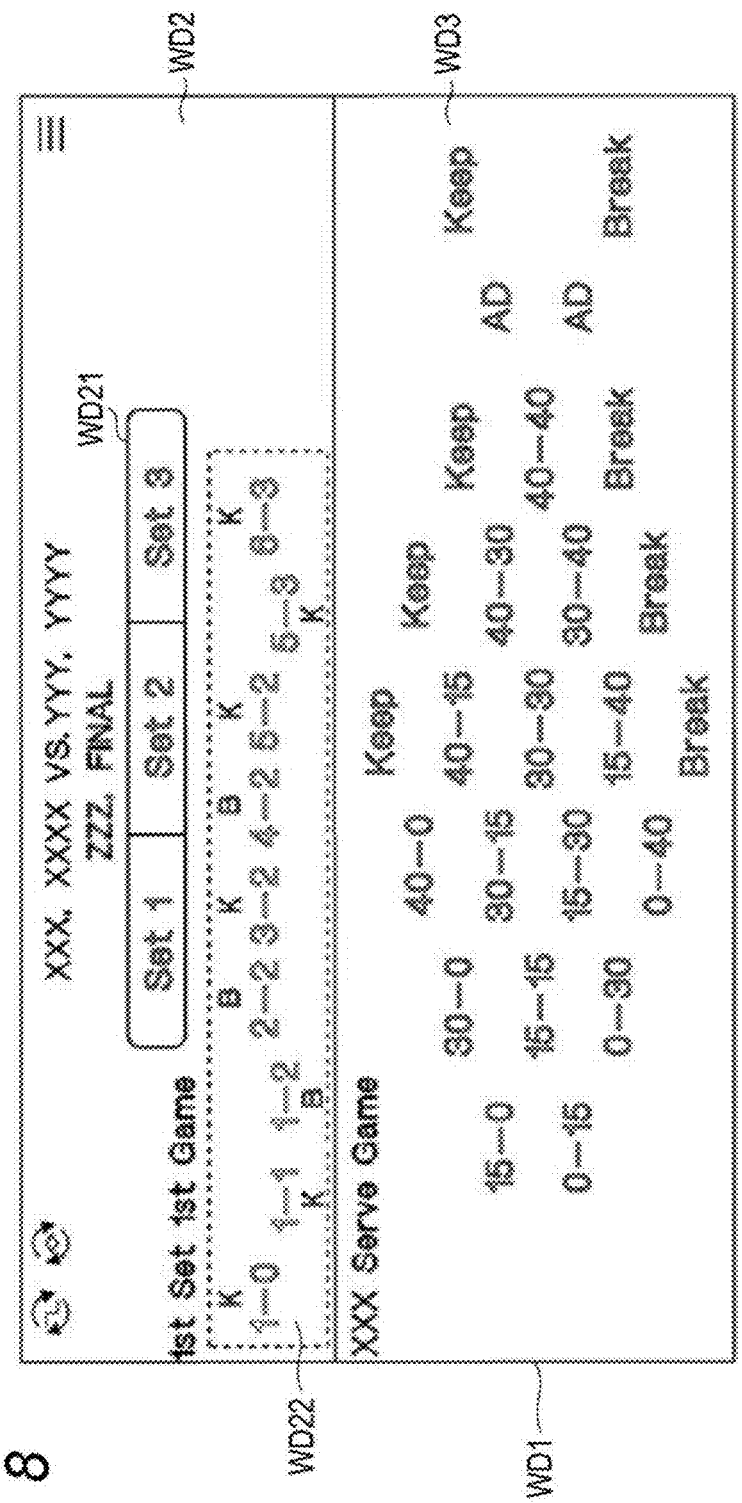
FIG. 8 is a view example of the display screen of the first embodiment.
Figure 8:
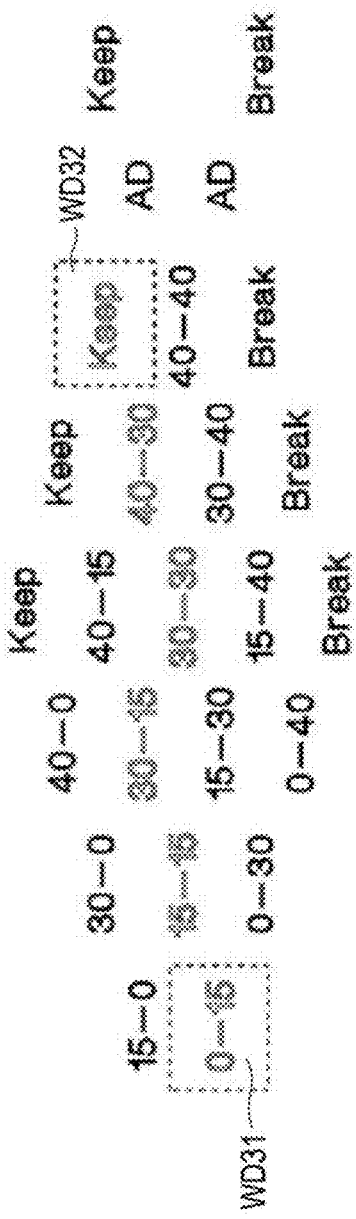

As illustrated in FIG. 8(a), a display screen WD1 includes display screens WD2 and WD3 and score display units WD21 and WD22. FIG. 8(b) illustrates a display example of the display object group. As in FIG. 7(b), the display object group is regularly arranged.

In the tree structure in FIGS. 7(a) and 7(b) and the tree structure in FIGS. 8(a) and 8(b), different display objects serve as the start point and the end point in the tree structure. Note that the display object groups illustrated in FIGS. 7(b) and 8(b) indicate the same score history. Note that display examples of the display object groups illustrated in FIGS. 7(b) and 8(b) in the first embodiment correspond to a first display mode and a second display mode, respectively.

In the display example (second display mode) of the display object group illustrated in FIG. 8(b), the display processing of the display object indicating the appearance of 0-0 regularly arranged as the start point of the tree structure is suppressed, and the display object indicating the score immediately before the number of acquired games changes is subjected to the display processing as the end point of the tree structure. Specifically, the display object indicating the appearance of 0-15 is subjected to the display processing as the start point of the tree structure, and the display processing of the display object indicating the appearance of 0-0 is suppressed. Furthermore, the display object indicating the appearance of keep or break corresponding to a point serving as a turning point at which the number of acquired games changes is subjected to the display processing as the end point of the tree structure.

The regular arrangement regarding the two different display object groups illustrated in FIGS. 7(a), 7(b), 8(a), and 8(b) is preferably switched by pressing a predetermined input unit on each of the display screens WC2 and WD2.

In the display object group arranged in the tree structure, in a case where the server keeps the game without acquiring a point or reaching deuce, the display processing of the display object indicating the score after second 40-40 is not performed. Furthermore, in a case where the returner breaks the game without giving a point to the server or without reaching deuce also, the display processing of the display object indicating the score after second 40-40 is similarly suppressed. Note that a type of the display object the display processing of which is suppressed in a case it does not reach deuce may include first AD in the game.

Figure 9:
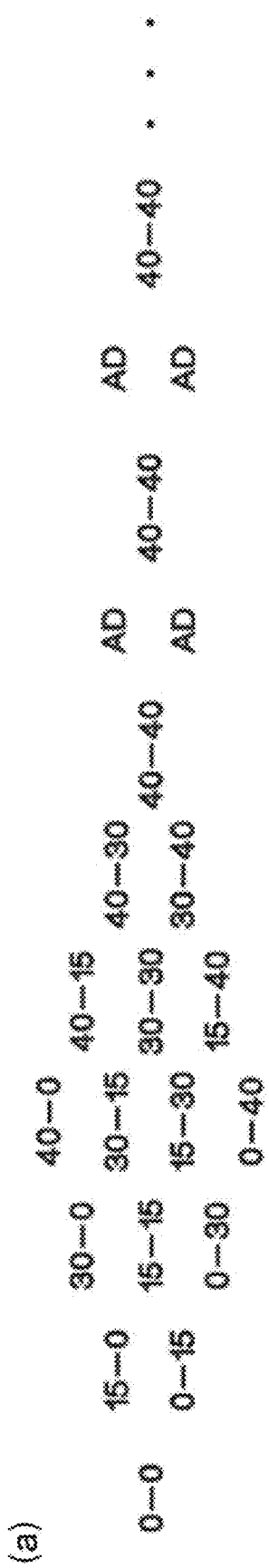
FIG. 9 is a schematic diagram of a plurality of display objects of the first embodiment.
Figure 9:
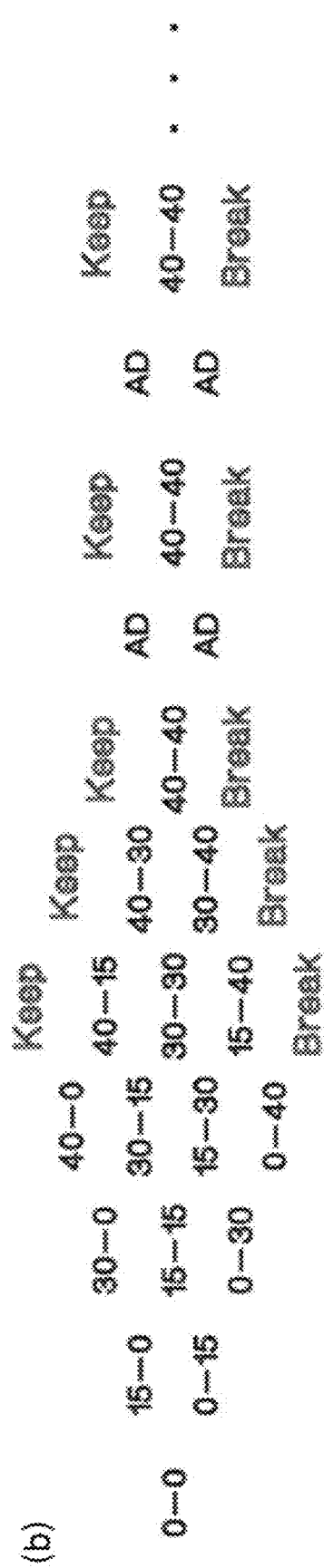

FIG. 9 illustrates a display example of the display object group in a case where the game situation goes to deuce. In this display example, the display object is additionally arranged and the display screen W2 extends until the number of acquired games changes. At that time, the display processing of the display screen W2 is performed from the start point to the end point in the tree structure without screen transition from the display screen WC1 by a scroll operation and the like by the user. Note that, since the display object is added on the basis of a game progress situation, there is no limitation in upper limit of a data amount regarding the addition within a range in which processing by a hardware resource of the moving image playback system 1 is possible.

Figure 10:
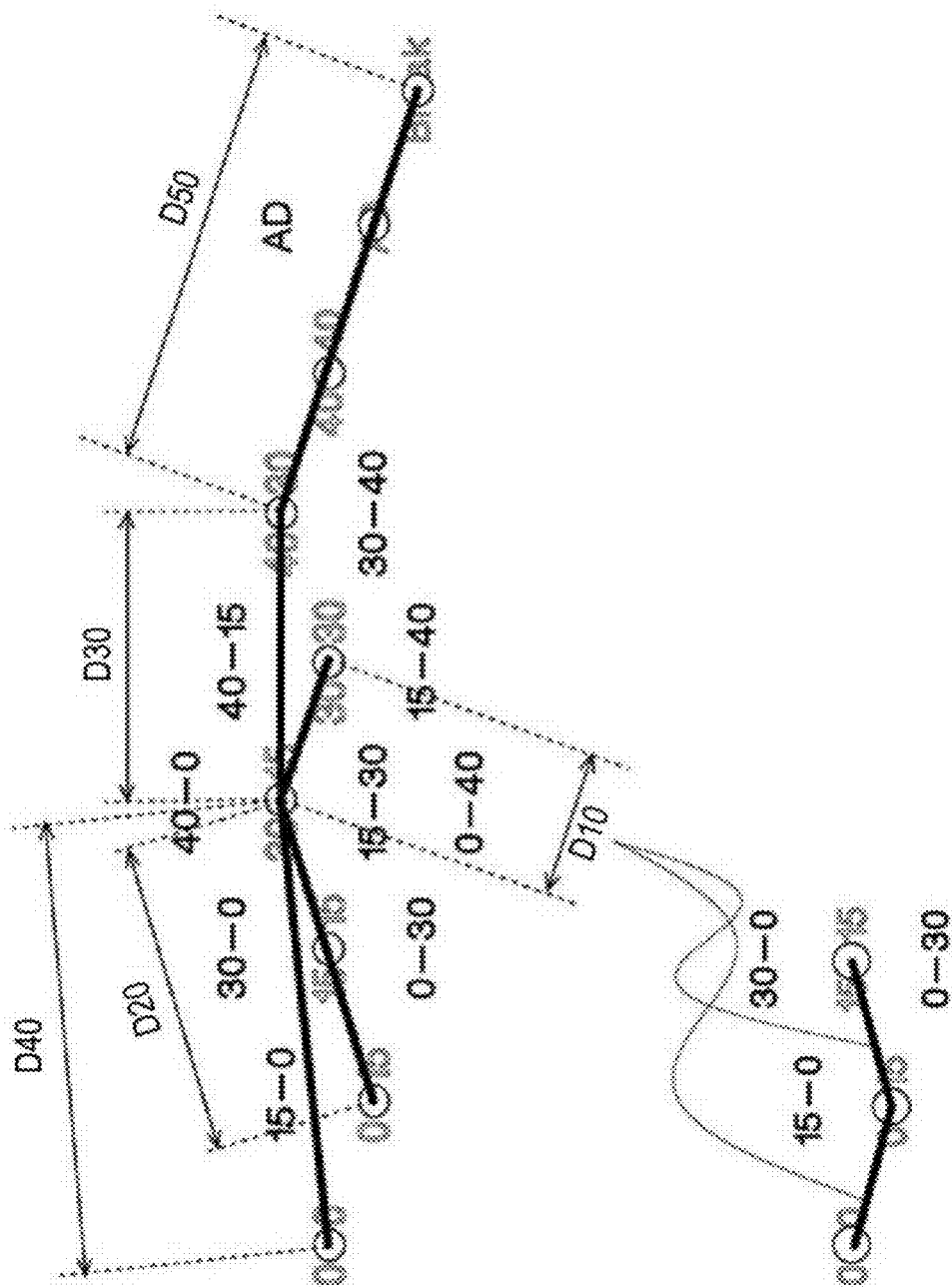
FIG. 10 is a schematic diagram of a plurality of display objects of the first embodiment.

As illustrated in FIG. 10, an effective display object group in the first embodiment is regularly arranged. Hereinafter, regularity regarding the arrangement of the effective display object group is described. Note that, in FIG. 10, for the sake of simplicity, the display object is partially omitted.

The display means 24 is preferably configured to perform display processing of the effective display object group such that a distance between the center of an arbitrary effective display object and the center of a nearest neighbor effective display object becomes a first predetermined distance D10 and has short-range order.

The display means 24 is preferably configured to perform the display processing of the effective display object group such that a distance between the center of an arbitrary effective display object and the center of a second nearest neighbor effective display object becomes a second predetermined distance D20 or a third predetermined distance D30 and has middle-range order.

The display means 24 is preferably configured to perform the display processing of the effective display object group such that a distance between the center of an arbitrary effective display object and the center of a third nearest neighbor effective display object becomes a fourth predetermined distance D40 or a fifth predetermined distance D50 and has a local structure.

The first predetermined distance D10, the second predetermined distance D20, the third predetermined distance D30, the fourth predetermined distance D40, and the fifth predetermined distance D50 in the first embodiment are preferably determined as appropriate on the basis of a screen size of the user terminal.

The arrangement of the effective display object group does not need to satisfy all the regularities described above, and the regularity having at least one of the short-range order, medium-range order, and local structure may be applied to the display object group.

It is possible that the above-described regularity is partially unsatisfied in order to distinguish an arbitrary display object from other display objects in appearance. The distance between the effective display objects may be determined not between the centers of the display objects but in a range also including ends thereof.

Figure 11:
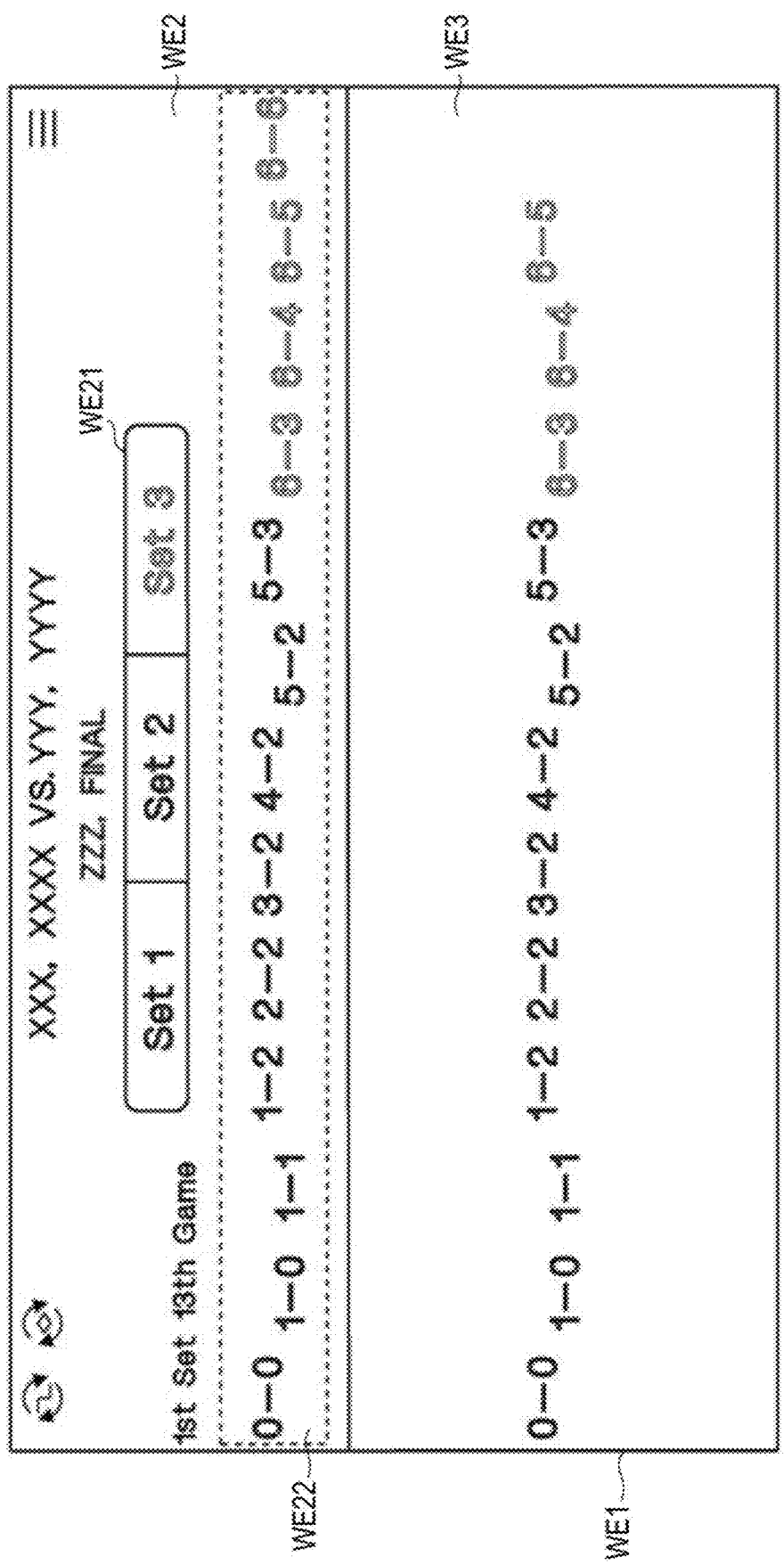
FIG. 11 is a view example of the display screen of the first embodiment.

As illustrated in FIG. 11, a display screen WE1 includes display screens WE2 and WE3.

The display screen WE2 includes score display units WE21 and WE22 that perform display processing of information regarding the number of acquired sets and games on the basis of the game situation in addition to the names of the player and the game venue.

In the display screen WE3, the display object group including one or more effective display objects is arranged in a lateral direction and is subjected to the display processing. The display object group on the display screen WE3 may include the display object. Furthermore, the display object group is extended according to a game progress, such as an increase in game time. The extended display object group is subjected to the display processing from the start point to the end point by the scroll operation and the like.

Figure 12:
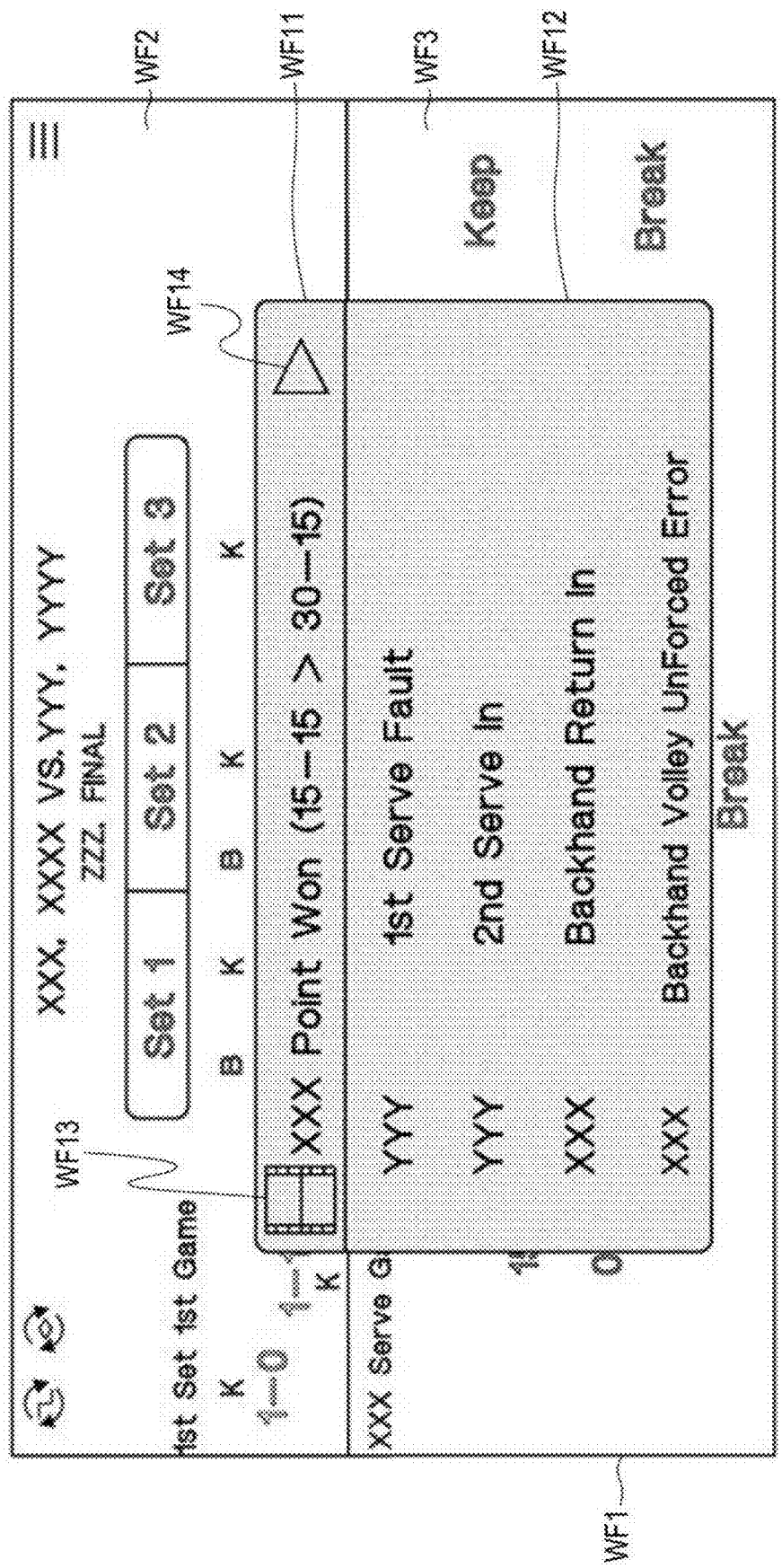
FIG. 12 is a view example of the display screen of the first embodiment.

As illustrated in FIG. 12, when an arbitrary effective display object is designated on a display screen WF1, a display screen WF11 at least indicating the game situation associated with the play type information and a display screen WF12 indicating the information regarding the play content out of the play type information are superimposed on the display screen WF3 and/or the display screen WF2 and subjected to the display processing.

The display screen WF11 includes a moving image selection unit WF13 and a moving image playback unit WF14. Note that the display means 24 may be configured to suppress the display processing of the display screen WF12 associated with the designation of the effective display object and perform only the display processing of the display screen WF11.

The display means 24 ends the display processing of the display screens WF11 and WF12 in response to the user operation on the display screen WF1 as a turning point. At that time, as an example, the user operation is pressing by the user on a region on the display screen WF1 in which the display processing of the display screens WF11 and WF12 is not performed. The display screen WF1 may include an input unit for performing an intention input regarding the end of the display processing.

The display screen WF1 transits to the playback screen W3 of the associated moving image in response to pressing of the moving image playback unit WF14 as a turning point. At that time, the playback processing of the moving image is performed on the basis of the time stamp associated with the effective display object.

As an example, a playback start point in the playback processing of the moving image may be based on a scene a predetermined time before the time stamp corresponding to the first serve in the play result information corresponding to the designated effective display object, or may be based on the time stamp corresponding to a point acquisition scene such as an ace in an immediately preceding play result continuous in time series with the play result information.

Timing a predetermined time before or after the time stamp corresponding to the play result information may be a playback start point of the moving image in the first embodiment.

The display screen WF1 may be configured to transit to the playback screen W3 of the associated moving image in response to designation of the play content on the display screen WF12 as a turning point. At that time, the playback processing of the moving image is performed on the basis of the time stamp corresponding to the play content.

Second Embodiment

Hereinafter, a moving image playback system 1 according to a second embodiment of the present invention is described. Note that a configuration similar to that of the first embodiment is denoted by a similar reference sign, and the description thereof is not repeated.

The moving image playback system 1 according to the second embodiment of the present invention is described by illustrating a case of performing display processing of a moving image and play type information of basketball.

Note that it goes without saying that an input screen used for inputting game information of basketball is configured by various modifications, corrections, and combinations that may be made by those skilled in the art within the scope of the present invention.

Figure 13:
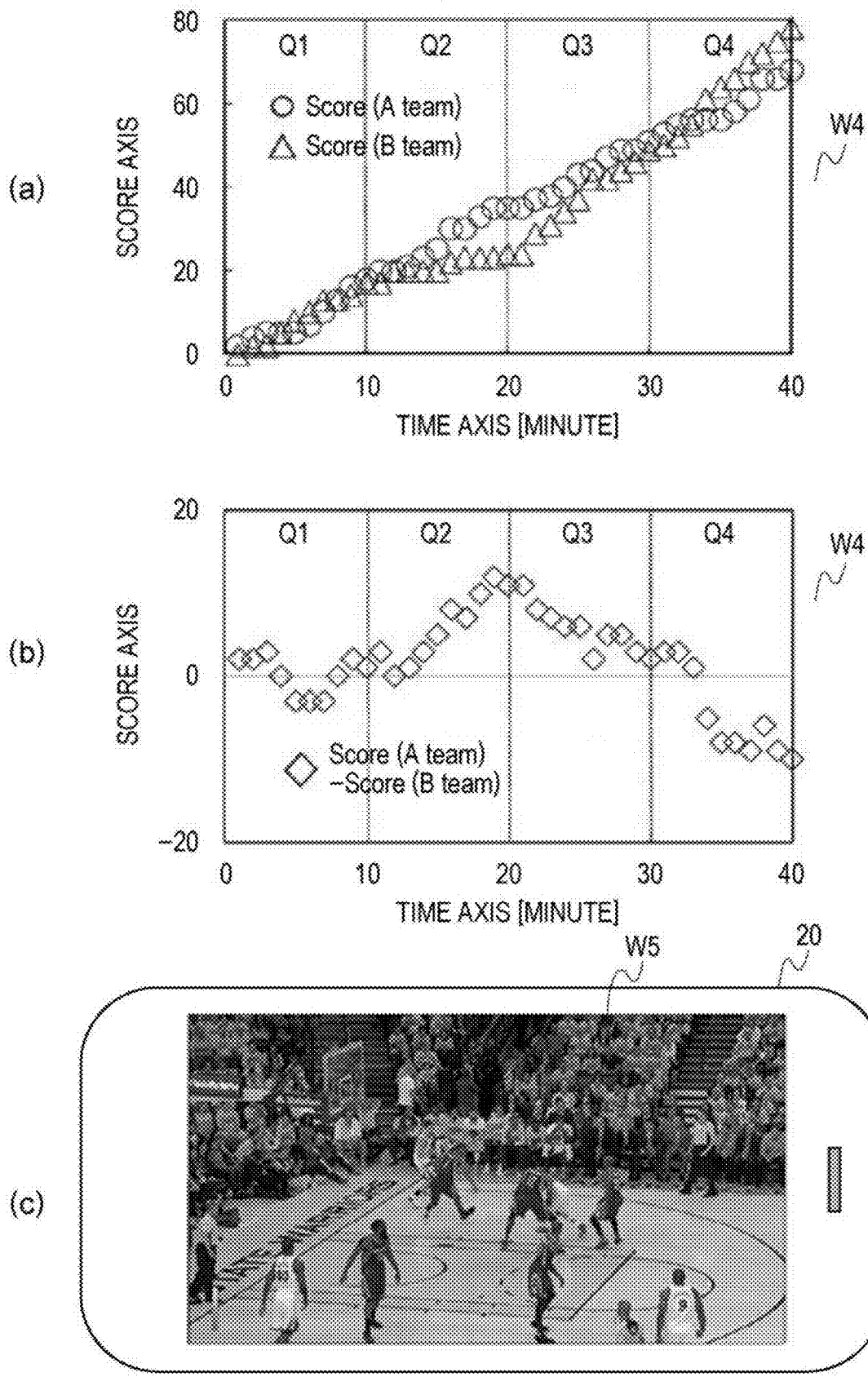
FIG. 13 is a view example of a display screen and a playback screen of a second embodiment.

FIG. 13(a) illustrates a display screen W4 in the second embodiment. Each of two different markers indicates a scoring status of one of competing teams.

In the second embodiment, an effective display object group is subjected to display processing on the basis of a time axis and a score axis. At that time, as an example, an effective display object is graphically drawn with a game elapsed time plotted along the abscissa and scoring points plotted along the ordinate. Two different effective display objects divided and determined for each team are subjected to display processing in a superimposed manner, and the effective display objects associated with the same team are connected by line segments.

When the effective display object is designated by a user operation, a display means 24 performs playback processing of a moving image on the basis of a time stamp associated with the effective display object.

FIG. 13(b) illustrates an example of the display screen W4 in the second embodiment. The effective display object is determined on the basis of a difference in scoring points between the competing teams, and graphically drawn with the game elapsed time plotted along the abscissa and the difference in scoring points plotted along the ordinate.

On the display screen W4, the playback processing of the moving image is performed on the basis of the time stamp corresponding to the effective display object in response to the designation of the effective display object by the user operation as a turning point.

FIG. 13(c) illustrates a playback screen W5 in the second embodiment. In response to the designation of the effective display object on the display screen W4, display processing of the playback screen W5 is performed.

Figure 14:
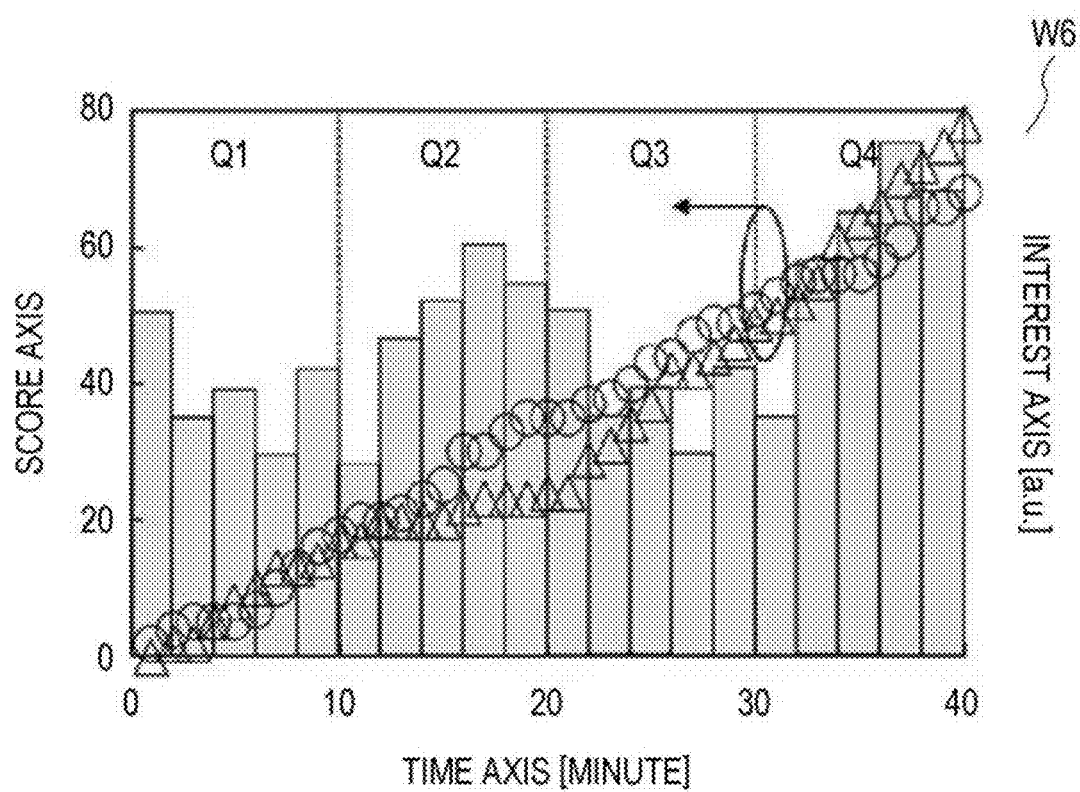
FIG. 14 is a view example of the display screen of the second embodiment.

As illustrated in FIG. 14, on a display screen W6, display processing of the effective display object may be performed on the basis of an interest axis based on additional information in addition to the time axis and the score axis. At that time, on the display screen W6, as an example, the score axis and the interest axis are the ordinate.

On the display screen W6, display processing of each of a correlation plot between time axis information and score axis information and a correlation plot between the time axis information and interest axis information is preferably performed. Here, the number of numerical values on the interest axis indicates a degree of excitement based on the additional information.

The score axis on the display screen W6 may correspond not only to a score included in play result information but also to numerical information such as a flying distance of a hit ball. An evaluation axis corresponding to character string information included in the play result information may be subjected to display processing instead of the score axis.

According to the present invention, it is possible to realize the moving image playback system capable of sequentially referring to a desired scene in sports on the basis of at least a score in a game.

REFERENCE SIGNS LIST

1 Moving image playback system
2 User terminal
20 Input/output user terminal
30 Imaging user terminal
21 Input means
22 Input reception means
23 Management means
24 Display means
31 Imaging means
201, 301 Arithmetic device
202, 302 Main storage device
203, 303 Communication device
204 Input device
205 Output device
206, 305 Recording device
207, 306 Operating system
1001 Moving image playback program
304 Imaging device
DB Database
D10 First predetermined distance
D20 Second predetermined distance
D30 Third predetermined distance
D40 Fourth predetermined distance
D50 Fifth predetermined distance
NW Network
S11, S12, S13, S14, S15, S16, S17, S18, S21, S22, S23, S24, S25 Step
W1, WA1, WB1 Input screen
WA2, WB2 Play content display unit
WA11, WA12, WA13, WA14, WA15, WA21, WA22, WA23, WA24,
WA102, WA103, WA104, WA105, WA202, WA203, WA204, WA205,
WA300, WB11, WB12, WB13, WB14, WB15, WB21, WB22, WB23,
WB24, WB102, WB103, WB104, WB202, WB203, WB204, WB300 Input unit
W2, W4, W6, WC1, WC2, WC3, WD1, WD2, WD3, WE1, WE2, WE3,
WF1, WF11, WF12, WF2, WF3 Display screen
WC21, WC22, WC31, WC32, WC33, WD21, WD22, WD31, WD32, WE21,
WE22 Score display unit
WF13 Moving image selection unit
WF14 Moving image playback unit
W3, W5 Playback screen

The invention claimed is:

1. A moving image playback system comprising:
a memory; and
a processor connected to the memory and that serves as:
an input processing unit that performs input processing of a time stamp corresponding to play result information including at least a score;
a display processing unit that performs display processing of each of a plurality of effective display objects indicating the play result information and corresponding to the time stamp; and
a management processing unit that associates a moving image with the plurality of effective display objects,
wherein the display processing unit performs the display processing such that a distance between each of the effective display objects and a nearest neighbor effective display object regarding each of the effective display objects is a first predetermined distance, at least one of the effective display objects to be performed the display processing indicating one of a point status and a scoring point status, and performs playback processing of the moving image based on the time stamp in response to at least one of designation of one of the effective display objects and designation of a display object to be performed the display processing by designating one of the effective display objects.

2. The moving image playback system according to claim 1, wherein
the display processing unit further performs the display processing such that a distance between each of the effective display objects and a second nearest neighbor effective display object regarding each of the effective display objects is a second predetermined distance or a third predetermined distance, at least one of the effective display objects to be performed the display processing indicating one of a point status and a scoring point status.

3. The moving image playback system according to claim 2, wherein
the display processing unit further performs the display processing such that a distance between each of the effective display objects and a second nearest neighbor effective display object regarding each of the effective display objects is a fourth predetermined distance or a fifth predetermined distance, at least one of the effective display objects to be performed the display processing indicating one of a point status and a scoring point status.

4. The moving image playback system according to claim 1, wherein
the display processing unit performs the display processing of one or more of the effective display objects by using a graph indicating a change with time in game progress in response to the play result information and the time stamp corresponding to each other, at least one of the effective display objects to be performed the display processing indicating one of a point status and a scoring point status, and performs playback processing of the moving image based on the time stamp in response to at least one of designation of one of the effective display objects and designation of a display object to be performed the display processing by designating one of the effective display objects.

5. The moving image playback system according to claim 1, wherein
the management processing unit associates each of the plurality of effective display objects with additional information, and the display processing unit distinguishes at least one of the plurality of effective display objects in appearance such that indicates one of a point status and a scoring point status and performs the display processing, and performs playback processing of the moving image based on the time stamp in response to at least one of designation of one of the effective display objects and designation of a display object to be performed the display processing by designating one of the effective display objects.

6. The moving image playback system according to claim 5, wherein
the management processing unit determines the additional information on a basis of voice information.

7. The moving image playback system according to claim 6, wherein
the management processing unit determines the additional information on a basis of play type information subjected to the input processing by the input processing unit.

8. The moving image playback system according to claim 5, wherein
the management processing unit determines the additional information on a basis of play type information subjected to the input processing by the input processing unit.

9. The moving image playback system according to claim 1, wherein
the display processing unit performs the display processing of a thumbnail image corresponding to each of at least one time stamp corresponding to the effective display objects, and performs the playback processing of the moving image based on the time stamp corresponding to a designated thumbnail image in response to designation of any one of the thumbnail image by the input processing unit.

10. A moving image playback method that allows causes a processor of a computer to execute:
performing, by an input processing unit, input processing of a time stamp corresponding to play result information including at least a score;
performing, by a display processing unit, display processing of each of a plurality of effective display objects indicating the play result information and corresponding to the time stamp; and
associating, by a management processing unit, a moving image with the plurality of effective display objects, wherein
the performing, by the display processing unit, performs the display processing such that a distance between each of the effective display objects and a nearest neighbor effective display object regarding each of the effective display objects is a first predetermined distance, at least one of the effective display objects to be performed the display processing indicating one of a point status and a scoring point status, and performs playback processing of the moving image based on the time stamp in response to at least one of designation of one of the effective display objects and designation of a display object to be performed the display processing by designating one of the effective display objects.

11. The moving image playback method in claim 10, wherein
the performing, by the display processing unit, performs the display processing of one or more of the effective display objects by using a graph indicating a change with time in game progress in response to the play result information and the time stamp corresponding to each other, and performs playback processing of the moving image based on the time stamp in response to at least one of designation of one of the effective display objects and designation of a display object to be performed the display processing by designating one of the effective display objects.

12. The moving image playback method in claim 10, wherein
the associating, by the management processing unit, associates each of the plurality of effective display objects with additional information, and the performing, by the display processing unit, distinguishes at least one of the plurality of effective display objects in appearance such that indicates one of a point status and a scoring point status and performs the display processing, and performs playback processing of the moving image based on the time stamp in response to at least one of designation of one of the effective display objects and designation of a display object to be performed the display processing by designating one of the effective display objects.

* * * * *